(12) United States Patent
Ari

(10) Patent No.: US 9,404,554 B2
(45) Date of Patent: Aug. 2, 2016

(54) TRANSMISSION CLUTCH DAMPER

(71) Applicants: Schaeffler Technologies AG & Co. KG, Herzogenaurach (DE); Schaeffler Group USA, Inc., Fort Mill, SC (US)

(72) Inventor: Vural Ari, Lynnfield, MA (US)

(73) Assignees: Schaeffler Technologies AG & Co. KG, Herzogenaurach (DE); Schaeffler Group USA, Inc., Fort Mill, SC (US)

( * ) Notice: Subject to any disclaimer, the term of this patent is extended or adjusted under 35 U.S.C. 154(b) by 0 days.

(21) Appl. No.: 14/310,331

(22) Filed: Jun. 20, 2014

(65) Prior Publication Data

US 2015/0021139 A1 Jan. 22, 2015

Related U.S. Application Data

(60) Provisional application No. 61/847,138, filed on Jul. 17, 2013.

(51) Int. Cl.
| | |
|---|---|
| *F16F 15/123* | (2006.01) |
| *F16D 3/66* | (2006.01) |
| *F16D 13/52* | (2006.01) |
| *F16D 13/68* | (2006.01) |
| *F16D 25/0638* | (2006.01) |

(52) U.S. Cl.
CPC ............ *F16F 15/12373* (2013.01); *F16D 3/66* (2013.01); *F16D 13/52* (2013.01); *F16D 13/683* (2013.01); *F16D 25/0638* (2013.01); *F16D 2300/22* (2013.01)

(58) Field of Classification Search
None
See application file for complete search history.

(56) References Cited

U.S. PATENT DOCUMENTS

| | | | |
|---|---|---|---|
| 4,422,535 A | 12/1983 | Ling | |
| 4,475,640 A | 10/1984 | Takeuchi et al. | |
| 5,045,027 A * | 9/1991 | Larsen | 464/63.1 |
| 6,142,033 A * | 11/2000 | Beigang | 74/457 |
| 2002/0053498 A1* | 5/2002 | Orlamunder | 192/212 |
| 2003/0089566 A1* | 5/2003 | Uehara | 192/3.3 |
| 2006/0188328 A1* | 8/2006 | Gutierrez et al. | 403/359.1 |
| 2007/0017767 A1* | 1/2007 | Breier | 192/3.51 |
| 2007/0199787 A1 | 8/2007 | Graf et al. | |
| 2012/0322565 A1* | 12/2012 | Nishitani | 464/68.1 |

FOREIGN PATENT DOCUMENTS

| | | |
|---|---|---|
| DE | 4003076 | 8/1991 |
| DE | 10 2011 087 879 A1 * | 6/2012 |

* cited by examiner

*Primary Examiner* — Colby M Hansen
(74) *Attorney, Agent, or Firm* — Volpe and Koenig, P.C.

(57) ABSTRACT

A transmission clutch damper assembly having an outer carrier with at least one spring retainer plate located therein. At least one spring is retained by stops in the spring retainer plate. A hub having radially outwardly extending castles is provided. Upon rotation of the outer carrier in a first direction relative to the hub, the castles are acted upon by a first spring end, and upon rotation of the outer carrier in a second direction relative to the hub, the castles are acted upon a second spring end. Two of the spring retainer plates can be provided with a drive ring therebetween adapted to contact the castles dependent upon a relative rotational position of the hub and the outer carrier, establishing a direct drive connection.

16 Claims, 3 Drawing Sheets

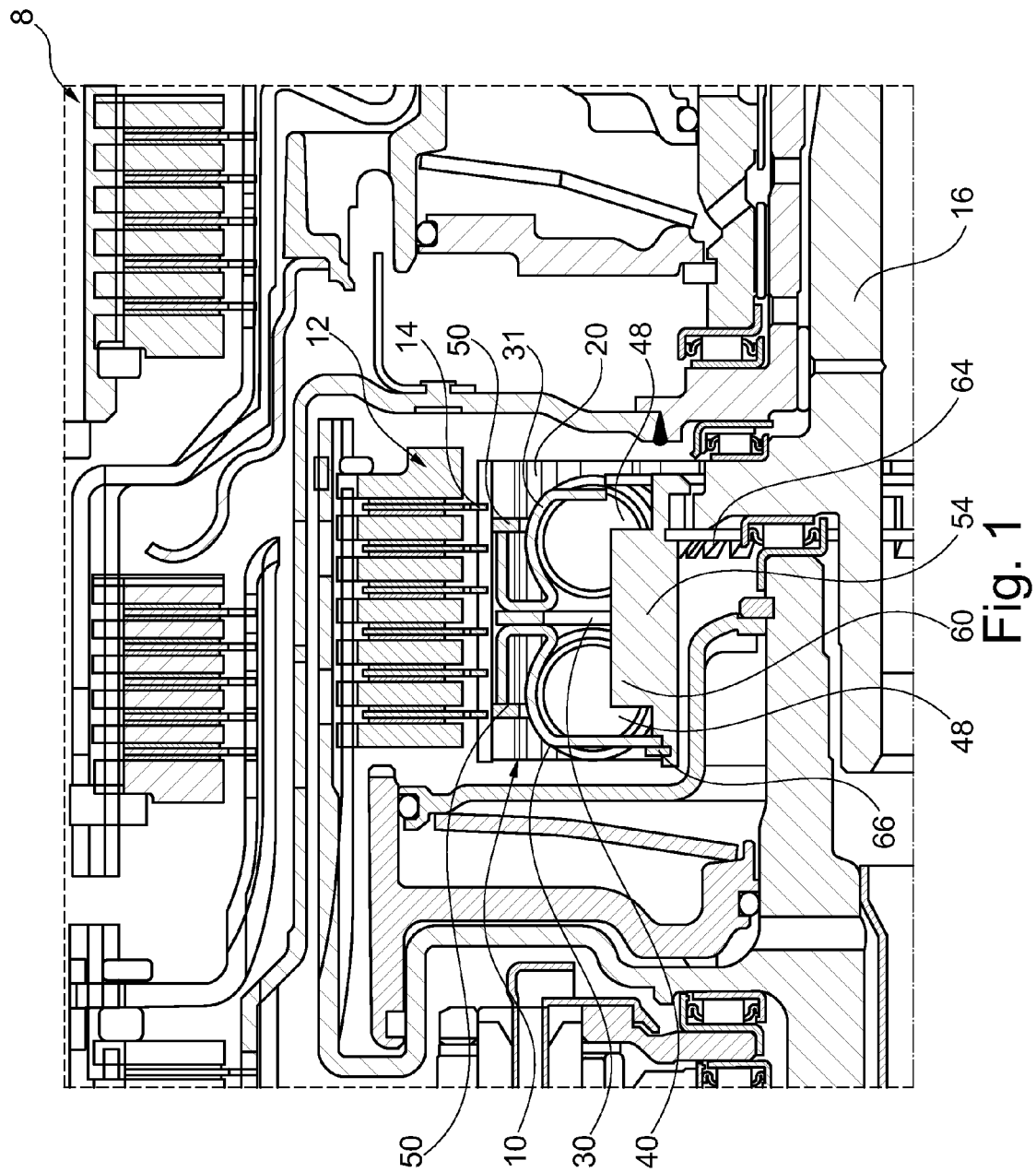

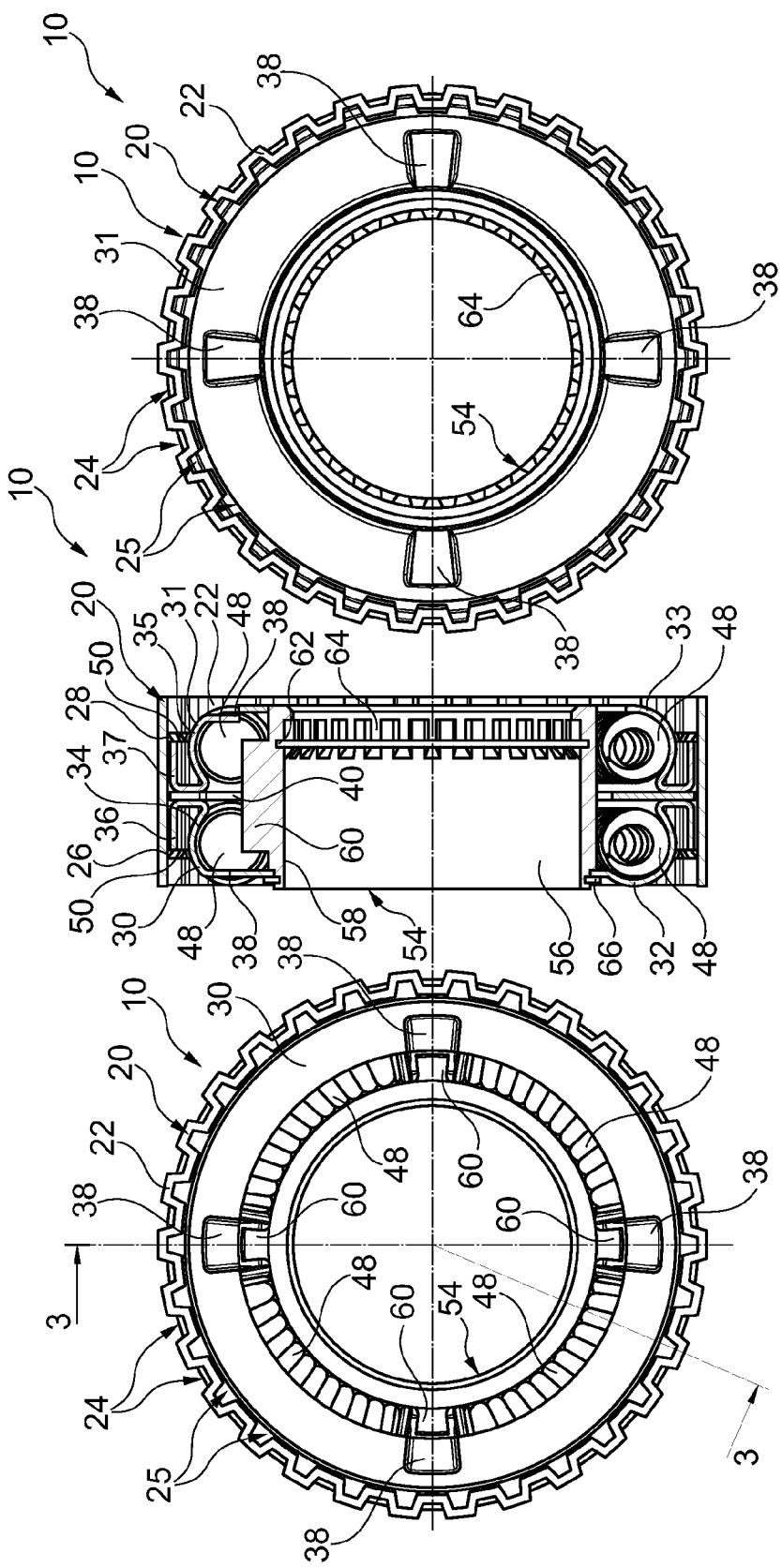

TRANSMISSION CLUTCH DAMPER

INCORPORATION BY REFERENCE

The following documents are incorporated herein by reference as if fully set forth: U.S. Provisional Patent Application No. 61/847,138, filed Jul. 17, 2013.

FIELD OF INVENTION

The present invention relates to automatic transmissions, and more particularly to clutch dampers used in connection with power input to the transmission input shaft.

BACKGROUND

Compound damper assemblies for automatic transmissions are known, for example as shown in U.S. Pat. No. 4,422,535. These dampers typically reside outside the transmission, generally within the torque converter. These known damper assemblies generally include springs which are arranged in series or parallel generally within one axial plane in order to cushion the application of a direct drive friction clutch which locks the impeller and the turbine of a torque converter to establish a mechanical torque delivery path that is arranged in parallel with respect to the hydro-dynamic torque delivery path provided by the impeller blades and turbine blades in the torque converter.

In order to improve noise and vibration isolation, it would be desirable to provide a damper assembly which can be arranged within the drive line between the engine and automatic transmission with the damper being located within the transmission assembly rather than in the torque converter so that it is closer to the clutch elements and/or torque output elements.

SUMMARY

Briefly stated, a transmission clutch damper assembly is provided having an outer carrier and at least one spring retainer plate located within the outer carrier and having an axial flange with spring stops, a radial flange, and fingers or teeth that engage an inner surface of the outer carrier. At least one spring is retained on the at least one spring retainer plate by the axial flange and contact between the first and second spring ends and the spring stops. A hub is provided having an annular hub body with at least two radially outwardly extending castles so that upon rotation of the outer carrier in a first direction relative to the hub, the castles are acted upon by the first spring end, and upon rotation of the outer carrier in a second direction relative to the hub, the castles are acted upon by the second spring end. A spline located on the hub that is adapted to drivingly engage corresponding splines on a transmission drive shaft.

In one preferred arrangement, first and second spring retainer plates are located within the carrier. A drive ring is located between the first and second spring retainer plates, with the drive ring is connected to the outer carrier. Drive fingers extend radially, inwardly from the drive ring. At least one spring is retained in each of the spring retainer plates. The drive fingers extend in a space axially between the respective springs of the first and second spring retainer plates. Here, upon rotation of the outer carrier in the first direction relative to the hub, the castles are acted upon by the first ends of the springs in each of the spring retainer plates to create spring damping in the first direction, and upon rotation of the outer carrier in a second direction relative to the hub, the castles are acted upon the second ends of the springs in each of the spring retainer plates to create spring damping in the second direction. The drive fingers are adapted to contact the castles dependent upon a relative rotational position of the hub and the outer carrier in each of the first and second directions, establishing a direct drive connection between the outer carrier and the hub.

Preferably, the outer carrier includes an outer carrier body having outer splines adapted to engage a transmission clutch pack and inner splines that engage the spring retainer plates and the drive ring.

Preferably, circumferentially extending grooves are located on an inner surface of the outer carrier body and snap rings are located in each of the grooves, with the snap rings holding the spring retainer plates and the drive ring in axially fixed positions within the outer carrier. This allows pre-assembly of the outer carrier with the drive ring, the springs, and the spring retainer plates.

Preferably, the outer carrier body as well as the spring retainer plates are formed from sheet metal. The outer carrier body can be deep drawn in order to form the splines, and the spring retainer plates can be punched or formed in order to obtain a desired shape. Preferably, the spring stops are punched into the spring retainer plates.

Preferably, the drive ring also includes external teeth that engage the inner splines, which preferably extend axially in the outer carrier body. This arrangement allows the spring retainer plates as well as the drive ring to be axially slid into position and then retained in place using snap rings.

Preferably, the springs are arranged in axially adjacent pairs within the spring retainer plates.

With respect to the hub, in order to hold the hub in position preferably an outer groove is located on the hub body and receives a snap ring which radially overlaps one of the axial flanges of at least one of the spring retainer plates.

Preferably, an inner groove is located in the hub body and is adapted to receive a snap ring for connection to a transmission drive shaft.

BRIEF DESCRIPTION OF THE DRAWINGS

The foregoing Summary and the following detailed description will be better understood when read in conjunction with the appended drawings, which illustrate a preferred embodiment of the invention. In the drawings:

FIG. 1 is an enlarged cross-sectional view showing a portion of an automatic transmission including a damper assembly according to the invention connected to the transmission input shaft.

FIG. 2 is an axial end view of the damper assembly according to the invention.

FIG. 3 is a cross-sectional view taken along line 3-3 in FIG. 2.

FIG. 4 is an opposite axial end view of the damper assembly shown in FIG. 2.

DETAILED DESCRIPTION OF THE PREFERRED EMBODIMENTS

Figure 5:
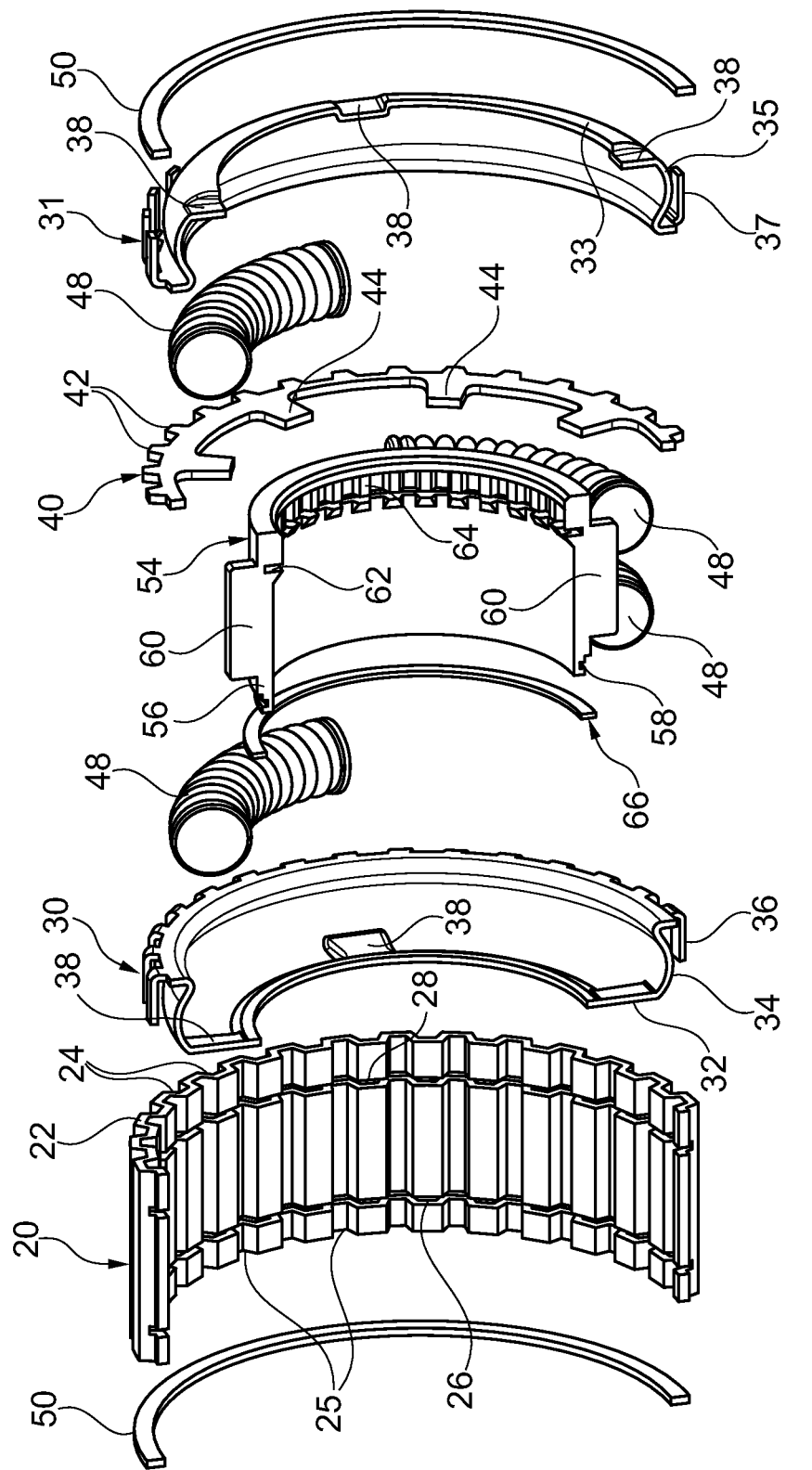
FIG. 5 is an exploded perspective view of the damper assembly illustrating the individual components thereof.

Certain terminology is used in the following description for convenience only and is not limiting. The words "front," "rear," "upper" and "lower"designate directions in the drawings to which reference is made. The words "inwardly" and "outwardly" refer to directions toward and away from the parts referenced in the drawings. "Axially" refers to a direction along the axis of a shaft or rotating part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Referring to FIG. 1, a cross-section view of a portion of an automatic transmission 8 is shown with a damper assembly 10 in accordance with the present invention assembled therein. The damper assembly 10 is used to transfer drive torque from an outer clutch pack 12 to the transmission clutch pack 14 and then through the damper assembly 10 to the transmission drive shaft 16.

The damper assembly 10 includes an outer carrier 20 shown in detail in FIGS. 2-5. The outer carrier 20 includes an outer carrier body 22 having outer splines 24 and inner splines 25. The outer splines 24 are adapted to engage the transmission clutch pack 14 and the inner splines 25 connect the spring retainer plates 30, 31 as well as the drive ring 40 to the outer carrier 20 as discussed in further detail below. The inner and outer splines preferably extend axially. Grooves 26, 28 shown most clearly in FIG. 5 are located on the inner surface of the outer carrier body 22. Preferably, the outer carrier body 22 is a deep drawn or pressed sheet metal part which can be made of steel and may be hardened, depending upon the loads to be carried.

Still with reference to FIGS. 2-4, first and second spring retainer plates 30, 31 are located within the outer carrier 20. Each of the spring retainer plates 30, 31 includes an axial flange 32, 33, a radial flange 34, 35 as well as fingers or teeth 36, 37 that are adapted to engage to an inner surface of the outer carrier 20 preferably via engagement with the inner splines 25 when the damper assembly 10 is assembled. Preferably, the fingers 36, 37 extend from the radial flange 34, 35 and may be bent back to overlap the axial extent of the axial flange 32, 33 as shown. Alternatively, instead of punched out fingers which are bent over, axially extending teeth can be provided. Preferably, the spring retainer plates 30, 31 are formed from sheet metal which, depending upon the particular application, can be hardened. In the preferred embodiment, the axial flanges 32, 33 of the first and second retainer plates 30, 31 face toward one another so that springs 48 located therein are located between the axial flanges 32, 33. It is also preferred that the radial flanges 34, 35 be curved to accommodate the curvature of the springs 48 in the axial direction of the transmission. Spring stops 38 are formed on the axial flange 32, 33. The spring stops 38 are preferably punched into the spring retainer plates 31, 32.

A drive ring 40 is located between the first and second spring retainers 30, 31. The drive ring 40 is connected to the outer carrier 20, preferably via teeth 42 of the drive ring 40 engaging the inner splines 25 of the outer carrier body 22. The drive ring 40 includes drive fingers 44 that extend radially inwardly from the drive ring.

At least one spring 48 is retained in each of the spring retainer plates 30, 31. The spring stops 38 contact the first and second ends of the springs 48 to retain the springs 48 in the respective spring retainer plates 30, 31. Preferably, four springs 48 are provided in each of the spring retainer plates 30, 31. However, those skilled in the art will recognize that various numbers of springs 48 can be utilized depending upon the arrangement of the spring stops 38.

The drive fingers 44 extend in the space axially between the respective springs 48 of the first and second spring retainer plates 30, 31. Preferably, the drive ring 40 is held captive in position between the facing ends of the axially extending flanges 34, 35 of the spring retainer plates 30, 31. As shown, a return is preferably formed on the ends of the axially extending flanges from which the fingers 36, 37 extend.

The springs 48 are preferably arc-shaped helical springs. The springs 48 are preferably arranged in axially adjacent pairs.

A hub 54 having an annular hub body 56 with at least two radially outwardly extending castles 60 is provided. Upon rotation of the outer carrier 20 in a first direction relative to the hub 54, the castles 60 are acted upon by the first ends of the springs 48 in each of the spring retainer plates 30, 31 to create spring damping in the first direction. Upon rotation of the outer carrier 20 in a second direction relative to the hub 54, the castles 60 are acted upon by the second ends of the spring 48 in each of the spring retainer plates 30, 31 to create spring damping in the second direction. In order to limit the travel of the outer carrier 20 relative to the hub 54, the drive fingers 44 of the drive ring 40 are adapted to contact the castles 60 based upon a maximum relative rotation of the hub 54 and the outer carrier 20 with respect to each other in each of the first and second directions. An inner spline 64 is located on the hub 54 that is adapted to drivingly engage corresponding splines on the transmission drive shaft 16 as shown in FIG. 1.

In order to assemble the transmission clutch damper assembly 10, the components can be axially slid into position within the outer carrier 20 and held in position via snap rings 50 which engage in the grooves 26, 28 in the inner surface of the outer carrier body 22. As shown in FIG. 1, a snap ring 66 is located in an outer groove 58 located on the hub 54 that radially overlaps one of the axial flanges 32 of one of the spring retainer plates 30 in order to hold the damper assembly 10 in a pre-assembled state. The damper assembly 10 is retained in engagement with the transmission drive shaft 16 via an additional snap ring which can be engaged in the inner groove 62 of the hub 54.

The arrangement of the springs 48 in axially adjacent pairs provides for a compact damper assembly 10 with comparatively high damping forces generated by the springs 48 within a relative compact radial space. This provides advantages for both noise and vibration reduction within the transmission while allowing dampened torque to be transferred to the drive shaft. The solid contact between the fingers 44 of the drive ring 40 and the castles 60 of the hub 54 provide for direct torque transfer once a maximum allowed rotation between the outer carrier 20 and the hub 54 has occurred.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A transmission clutch damper assembly, comprising:
    an outer carrier including an outer circumference with inner and outer splines;
    first and second spring retainer plates located within the outer carrier, each of the spring retainer plates having an axial flange with spring stops, a radial flange, and fingers or teeth that engage the outer carrier inner spline;

at least one spring retained in each of the first and second spring retainer plates by the respective axial flanges and contact between respective first and second spring ends and the respective spring stops;

a hub having an annular hub body with at least two radially outwardly extending castles so that upon rotation of the outer carrier in a first direction relative to the hub, the castles are acted upon by each of the first spring ends to create spring damping in the first direction, and upon rotation of the outer carrier in a second direction relative to the hub, the castles are acted upon by each of the second spring ends to create spring damping in the second direction, and a spline located on the hub that is adapted to drivingly engage corresponding splines on a transmission drive shaft; and a drive ring located between the first and second spring retainer plates, the drive ring including fingers or teeth that engage the outer carrier inner spline and drive fingers extending radially inwardly from the drive ring into a space axially between the respective springs of the first and second spring retainer plates, the drive fingers radially overlapping the castles of the hub to limit a maximum relative rotation of the outer carrier relative to the hub.

2. The transmission clutch damper assembly of claim 1, wherein the outer carrier includes an outer carrier body having the outer splines adapted to engage a transmission clutch pack and inner splines that engage the spring retainer plates.

3. The transmission clutch damper assembly of claim 1, wherein the drive ring is a sheet metal part.

4. The transmission clutch damper assembly of claim 1, wherein the outer carrier includes an outer carrier body having the outer splines that are adapted to engage a transmission clutch pack and the inner splines that engage the spring retainer plates.

5. The transmission clutch damper assembly of claim 4, wherein circumferentially extending grooves are located on an inner surface of an outer carrier body, and a snap ring is located in each of the grooves to hold the spring retainer plates in an axially fixed position.

6. The transmission clutch damper assembly of claim 4, wherein an outer carrier body is a deep drawn or pressed sheet metal part.

7. The transmission clutch damper assembly of claim 4, wherein the fingers or teeth extend from the radial flange.

8. The transmission clutch damper assembly of claim 1, wherein the springs are arc-shaped helical springs.

9. The transmission clutch damper assembly of claim 1, wherein the springs are arranged in axially adjacent pairs.

10. The transmission clutch damper assembly of claim 1, wherein an outer groove is located on the hub body and receives a snap ring that radially overlaps one of the axial flanges of one of the spring retainer plates.

11. The transmission clutch damper assembly of claim 1, wherein the spring retainer plates are formed from sheet metal.

12. The transmission clutch damper assembly of claim 11, wherein the spring stops are punched into the spring retainer plates.

13. The transmission clutch damper assembly of claim 1, wherein an inner groove is located in the hub body and is adapted to receive a snap ring for connection to the transmission drive shaft.

14. An automatic transmission comprising:

a transmission input shaft;

a damper assembly connected to the input shaft, the damper assembly including:

an outer carrier including an outer circumference with inner and outer splines;

first and second spring retainer plates located within the outer carrier, each of the spring retainer plates having an axial flange with spring stops, a radial flange, and fingers or teeth that engage the outer carrier inner spline, at least one spring retained in each of the spring retainer plates by the respective axial flanges and contact between respective first and second spring ends and the respective spring stops;

a hub having an annular hub body with at least two radially outwardly extending castles so that upon rotation of the outer carrier in a first direction relative to the hub, the castles are acted upon by each of the first springs ends to create spring damping in the first direction, and upon rotation of the outer carrier in a second direction relative to the hub, the castles are acted upon by each of the second spring ends to create spring damping in the second direction, and a spline located on the hub that drivingly engages corresponding splines on the transmission input shaft; and a drive ring located between the first and second spring retainer plates, the drive ring including fingers or teeth that engage the outer carrier inner spline and drive fingers extending radially inwardly from the drive ring into a space axially between the respective springs of the first and second spring retainer plates, the drive fingers radially overlapping the castles of the hub to limit a maximum relative rotation of the outer carrier relative to the hub.

15. The automatic transmission of claim 14, further comprising an outer clutch pack having friction surfaces that are engagable with a transmission clutch pack attached to the outer carrier.

16. The automatic transmission of claim 14, wherein the damper assembly is pre-assembled and connected to the transmission input shaft by a snap ring.

* * * * *